No. 624,729. Patented May 9, 1899.
R. S. ATWATER.
PHOTOGRAPH SHUTTER.
(Application filed June 22, 1898.)
(No Model.)

WITNESSES:
Sew. C. Curtis
N. W. Munday

INVENTOR:
REEVE S. ATWATER.
BY Munday, Evarts & Adcock
HIS ATTORNEYS.

UNITED STATES PATENT OFFICE.

REEVE S. ATWATER, OF WESTERN SPRINGS, ILLINOIS, ASSIGNOR TO THE VIVE CAMERA COMPANY, OF CHICAGO, ILLINOIS.

PHOTOGRAPH-SHUTTER.

SPECIFICATION forming part of Letters Patent No. 624,729, dated May 9, 1899.

Application filed June 22, 1898. Serial No. 684,121. (No model.)

*To all whom it may concern:*

Be it known that I, REEVE S. ATWATER, a citizen of the United States, residing in Western Springs, in the county of Cook and State of Illinois, have invented a new and useful Improvement in Shutters for Cameras, of which the following is a specification.

The object of the present invention is the construction of a simple, cheap, and effective shutter specially adapted for hand-cameras of the well-known Vive class and which may be set to work either as an instantaneous or as a time shutter.

The nature of the invention will be understood from the subjoined description and claims and the accompanying drawings, which form a part of this specification.

Figure 1:
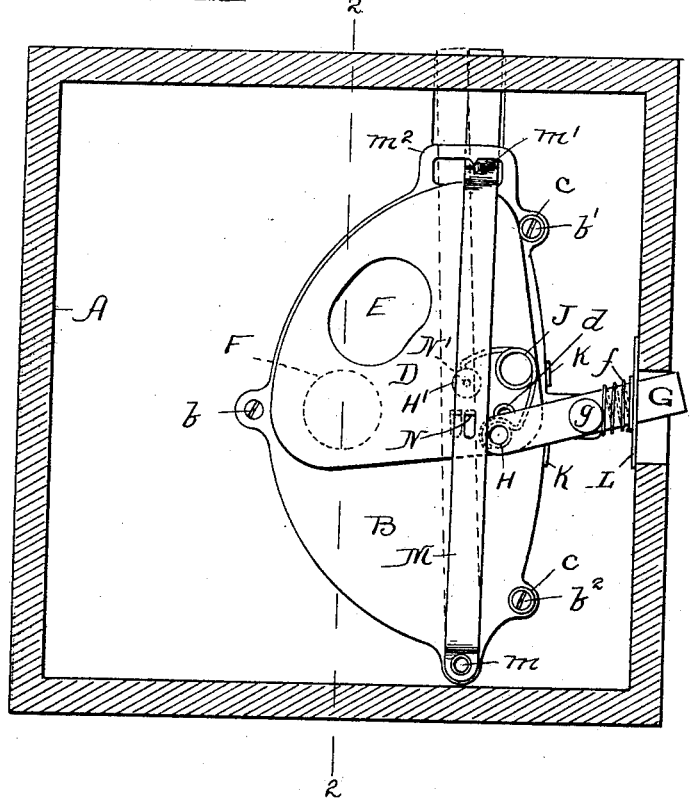
Figure 2:
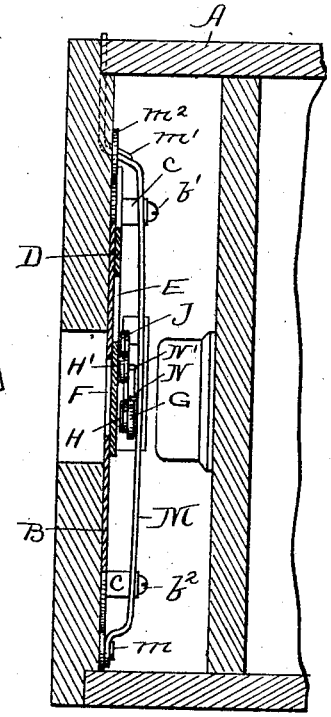
Figure 3:
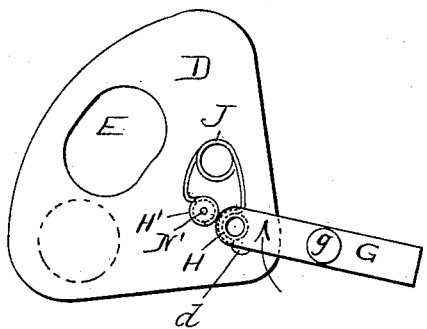
Figure 4:
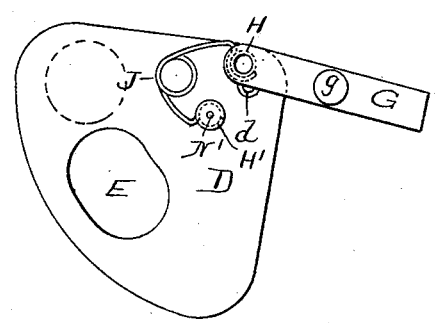

In said drawings, Figure 1 is a sectional view of the camera-box looking toward the front of the camera and showing a rear view of the shutter in elevation. Fig. 2 is a section on the line 2 2 of Fig. 1, and Figs. 3 and 4 are diagrams of the shutter and its moving lever and spring to illustrate the movement.

In said drawings like letters of reference indicate like parts wherever used in the several figures.

In the said drawings, A represents the camera-box.

B is a thin plate of sheet metal secured to the camera-box by the screws $b$ $b'$ $b^2$. This plate B is intended to serve as a framework to carry all the parts of the shutter which are mounted thereon, so that the whole device may be manufactured and set up in readiness to be applied to the camera, all the pivotal attachments being made to this plate, so that the shutter may be applied to the camera as a whole by means of the three screws $b$ $b'$ $b^2$ and as readily removed for purposes of repair, &c., when required. The screws $b'$ and $b^2$ are so positioned in the plate B that they may serve as limit pins or stops for the shutter to strike against in its movement, and for this purpose the shanks of these two screws are preferably furnished each with a rubber washer $c$. The quadrant-formed shutter is shown at D. This shutter is pivoted by the pivot $d$ to the plate B, and it is perforated near the edge on its flying side with the aperture E, which ought to be at least as large as the light-aperture F (shown in dotted lines at Figs. 1, 3, and 4) and which is in line with the lens and cut through the plate B.

G is the shutter-operating lever, and $g$ its pivotal attachment to the frame-plate B. The pivot $g$ of the lever G, the pivot $d$ of the shutter D, and the center of the light-opening to obtain the best results ought to be in line.

H is a stud on the inner end of the lever G, and H' is a similar stud on the shutter D.

J is a U-shaped spring, which is best made out of fine steel piano-wire, and preferably has at its middle portion one or more coils to increase its resiliency. The ends of this spring are shown to be hooked in opposite directions to engage, respectively, a groove in the stud H and in the stud H'.

The operation of the shutter is as follows: Suppose the shutter to stand in the position shown in Fig. 1. If the lever G is now operated, by moving its outer end downward its inner end will be raised, thus compressing the spring J, as shown in Fig. 3, and when said lever G reaches the position shown in said Fig. 3—that is to say, with its stud H a little past the pivot $d$—the compressed spring will throw the shutter with a snap action into the position shown at Fig. 4, the opening of the shutter having by this motion passed the light-opening and caused the instantaneous exposure, and from this position the next exposure may be made by similarly operating the lever G in the opposite direction, the spring J being again compressed and again snapping the shutter back to the position shown in Fig. 1. It will thus be seen that the shutter is always ready for use, always closed normally, and operated in either position of the lever G. No confusion can be caused in the mind of the photographer by this, because he is only required to move the lever G in whichever direction it is free to move, and the moving of the lever in either direction sets it in position to be moved in the other direction.

To prevent the lever G being moved too far in either direction, stops K K are provided, and these may be easily made by simply bending up portions of the plate B. If it is preferred to have the lever G project straight through the side of the camera-box to give a free movement, a dark slide may be employed (shown at L) to cover the aperture and move up and down with the lever, being held against the face of the camera-box by a feeble spring $f$.

To provide for use of this shutter in time exposures, I apply the long lever M, pivoted to said plate B at $m$, its extremity being carried through to the outside of the camera-box in position to be operated by the finger of the photographer. This lever carries a projection N, (see Figs. 1 and 2,) and the stud H′ is furnished with a pin N′. When the lever M is in the position indicated in full lines in Fig. 1, this pin N′ will, in the movement of the shutter, pass clear of the projection N on the lever M; but when the lever M is moved over into the position indicated in dotted lines at Fig. 1 the pin N′ will strike against said projection N and stop the shutter in a midway position, and standing thus the light-aperture will be open and remain open until the shutter is again operated either by moving the lever G or by moving the lever M. This time operation of opening the shutter and stopping it on the center will take place equally well from either the upper or lower position of the shutter indifferently, so that there is no cause for confusion in the photographer's mind relative to the act of operating the shutter. All he has to keep in mind is the fact that when the lever M is in one position the shutter will operate instantaneously, and when in the other position it will operate for time exposure, and these two positions of said lever M may be marked on the exterior of the camera-box with the words "Time" at one side and "Instantaneous" at the other, so that there need be no confusion and no reason for an accidental or unintentional exposure of the plate in setting the shutter. To keep the lever M firmly in whichever position it may be placed, it is provided with a detent, which may consist of a projection $m'$ on the lever and a bar $m^2$, provided with a projection on the plate B. The natural spring of the lever M will permit of this detent being disengaged in moving the lever from one side to the other, and yet will serve to hold it firmly enough in whichever position it is placed.

The apparatus as a whole is exceedingly effective and suited to the wants of the ordinary hand-camera to be used by unskilled people, and it is very cheap in construction and so contrived that it cannot readily get out of order.

I claim—

1. The combination of the pivoted shutter D, the pivoted lever G, the spring J, the pivoted lever M, the projection N on the lever M, and the projection N′ on the shutter, substantially as specified.

2. The combination of the pivoted shutter D, the pivoted lever G, the spring J, the pivoted lever M, the projection N on the lever M, the projection N′ on the shutter, and the detent for holding said lever in either of its two positions, substantially as specified.

REEVE S. ATWATER.

Witnesses:
H. M. MUNDAY,
S. E. CURTIS.